United States Patent
Xi et al.

(10) Patent No.: US 12,407,380 B2
(45) Date of Patent: Sep. 2, 2025

(54) NEURAL NETWORK STRUCTURE FOR FEEDBACK OF ORTHOGONAL PRECODING INFORMATION

(71) Applicant: QUALCOMM Incorporated, San Diego, CA (US)

(72) Inventors: Wei Xi, Beijing (CN); Chenxi Hao, Beijing (CN); Rui Hu, Beijing (CN); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/294,997

(22) PCT Filed: Oct. 29, 2021

(86) PCT No.: PCT/CN2021/127296
§ 371 (c)(1),
(2) Date: Feb. 2, 2024

(87) PCT Pub. No.: WO2023/070497
PCT Pub. Date: May 4, 2023

(65) Prior Publication Data
US 2025/0088226 A1    Mar. 13, 2025

(51) Int. Cl.
*H04B 7/0408* (2017.01)
*H04B 7/0456* (2017.01)
*H04B 7/06* (2006.01)

(52) U.S. Cl.
CPC ......... *H04B 7/0456* (2013.01); *H04B 7/0626* (2013.01)

(58) Field of Classification Search
CPC .. H04B 7/0408; H04B 7/0413; H04B 7/0417; H04B 7/0452; H04B 7/0695; H04B 7/088; H04B 7/0456; H04B 7/0626; H04W 52/146; H04W 52/16; H04W 52/325; H04W 52/08; H04W 72/21; H04W 72/51; H04W 72/23; H04W 52/42; H04L 1/1887;
(Continued)

(56) References Cited

U.S. PATENT DOCUMENTS

2009/0323773 A1* 12/2009 Bala ............... H04B 7/0654
375/141
2012/0218948 A1   8/2012 Onggosanusi et al.
(Continued)

FOREIGN PATENT DOCUMENTS

CN    107359921 A    11/2017
WO    2021028425 A1   2/2021

OTHER PUBLICATIONS

International Search Report and Written Opinion—PCT/CN2021/127296—ISA/EPO—May 23, 2022.

*Primary Examiner* — Eva Y Puente
(74) *Attorney, Agent, or Firm* — Seyfarth Shaw LLP

(57) ABSTRACT

A method of wireless communication by a base station includes receiving a channel state information (CSI) payload at a neural network CSI decoder. The method also includes decoding the CSI payload to generate a quantity (N) of precoding vectors for N transmission layers. The method further includes orthogonalizing the N precoding vectors to generate N orthogonal precoding vectors. The method still further includes transmitting, to a user equipment (UE), downlink data that is precoded in accordance with the N orthogonal precoding vectors.

24 Claims, 10 Drawing Sheets

(58) Field of Classification Search
CPC ... H04L 5/0023; H04L 5/0053; H04L 1/0026; H04L 5/001; H04L 1/0003; H04L 1/0009; H04L 1/1819

See application file for complete search history.

(56) References Cited

U.S. PATENT DOCUMENTS

| | | | |
|---|---|---|---|
| 2013/0070723 A1* | 3/2013 | Yie | H04B 7/0641 370/329 |
| 2014/0140438 A1* | 5/2014 | Silverman | H04B 7/0426 375/299 |
| 2020/0244425 A1 | 7/2020 | Wu et al. | |
| 2022/0394527 A1* | 12/2022 | Mittal | H04B 7/0417 |

* cited by examiner

NEURAL NETWORK STRUCTURE FOR FEEDBACK OF ORTHOGONAL PRECODING INFORMATION

FIELD OF THE DISCLOSURE

The present disclosure relates generally to wireless communications, and more specifically to a neural network structure for communicating orthogonal precoding information between a network and a user equipment (UE).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a base station includes receiving a channel state information (CSI) payload at a neural network CSI decoder. The method also includes decoding the CSI payload to generate a quantity (N) of precoding vectors for N transmission layers. The method further includes orthogonalizing the N precoding vectors to generate N orthogonal precoding vectors. The method still further includes transmitting, to a user equipment (UE), downlink data that is precoded in accordance with the N orthogonal precoding vectors.

Other aspects of the present disclosure are directed to an apparatus for wireless communication by a base station having a memory, and one or more processor(s) coupled to the memory. The processor(s) is configured to receive a channel state information (CSI) payload at a neural network CSI decoder. The processor(s) is also configured to decode the CSI payload to generate a quantity (N) of precoding vectors for N transmission layers. The processor(s) is further configured to orthogonalize the N precoding vectors to generate N orthogonal precoding vectors. The processor(s) is still further configured to transmit, to a user equipment (UE), downlink data that is precoded in accordance with the N orthogonal precoding vectors.

In other aspects of the present disclosure, a non-transitory computer-readable medium having program code recorded thereon is disclosed. The program code is executed by a processor and includes program code to receive a channel state information (CSI) payload at a neural network CSI decoder. The program code also includes program code to decode the CSI payload to generate a quantity (N) of precoding vectors for N transmission layers. The program code further includes program code to orthogonalize the N precoding vectors to generate N orthogonal precoding vectors. The program code still further includes program code to transmit, to a user equipment (UE), downlink data that is precoded in accordance with the N orthogonal precoding vectors.

Other aspects of the present disclosure are directed to an apparatus for wireless communication by a base station including means for receiving a channel state information (CSI) payload at a neural network CSI decoder. The apparatus also includes means for decoding the CSI payload to generate a quantity (N) of precoding vectors for N transmission layers. The apparatus further includes means for orthogonalizing the N precoding vectors to generate N orthogonal precoding vectors. The apparatus still further includes means for transmitting, to a user equipment (UE), downlink data that is precoded in accordance with the N orthogonal precoding vectors.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
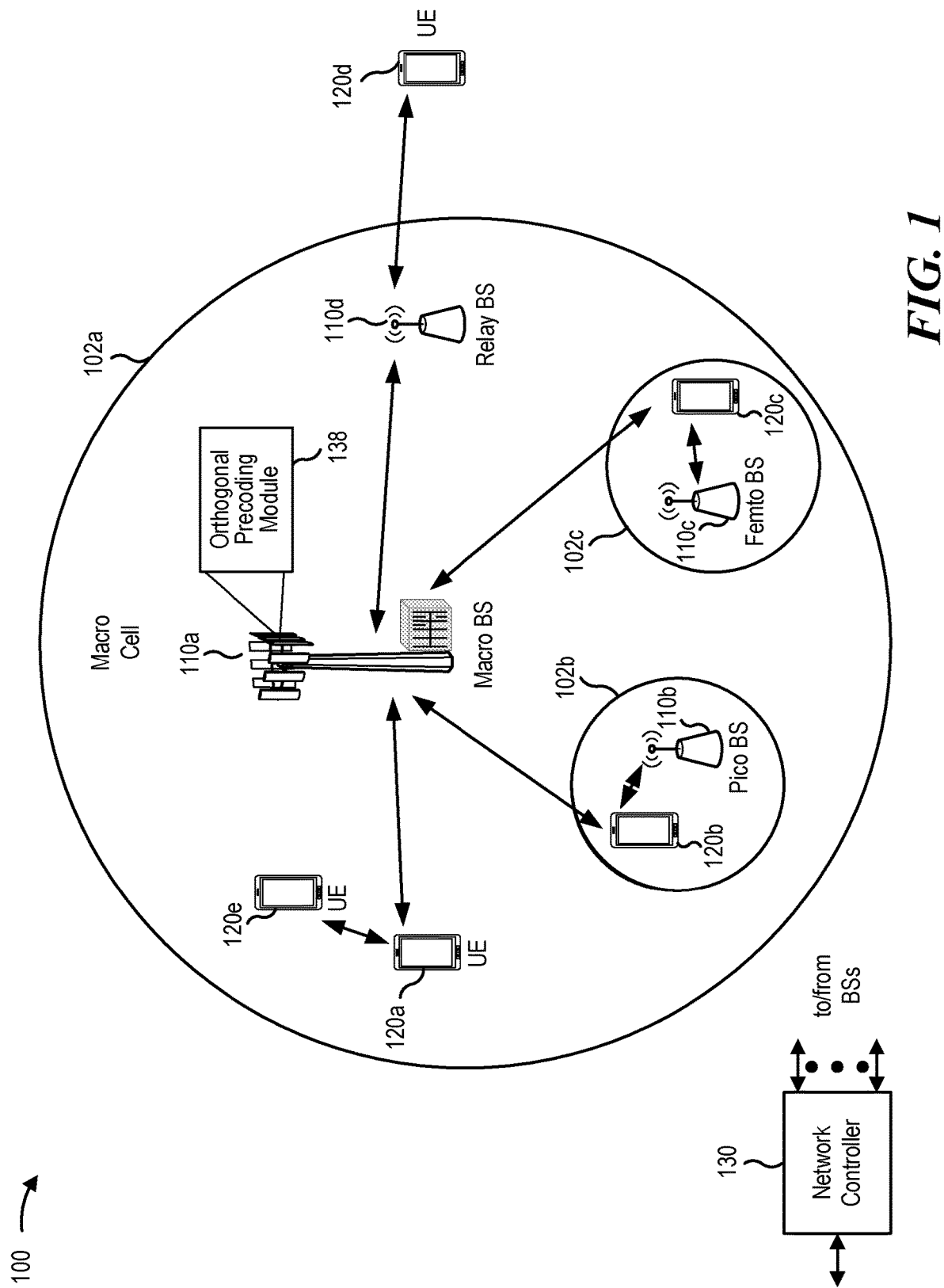
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Artificial intelligence (AI) is expected to be widely utilized in a variety of aspects of wireless communications. For example, a neural network may provide an artificial intelligence framework for communicating channel state information (CSI) between a base station and a user equipment (UE). CSI information may include precoding matrix indicator (PMI) feedback, as well as other information such as a rank indictor (RI) and a channel quality indicator (CQI). Unfortunately, in existing neural network structures for CSI feedback, inter-layer orthogonality cannot be guaranteed when multiple antennas are used for transmission at the base station. That is, existing functional layers and activation functions of CSI feedback neural networks do not address orthogonality. Undoubtedly, this will lead to inter-layer interference, lower post-detection signal to noise plus interference ratios (SINRs), and reduced spectral efficiency (SE). Aspects of the present disclosure introduce a dedicated inter-layer orthogonalization functional layer in a channel state information decoder (e.g., a neural network at the base station) to achieve orthogonality among precoding vectors for different layers of a high rank transmission.

A CSI network communicates channel state information feedback from a UE to a base station. A CSI encoder is a neural network operating at the UE, and a CSI decoder is a neural network running at the base station. The CSI encoder receives as input a measurement of a received signal, such as a channel state information-reference signal (CSI-RS). A feedback report associated with the channel is generated based on receiving the reference signal. The CSI encoder may transmit the feedback report to the base station as a CSI payload. The CSI decoder receives the reported CSI payload as input and processes the report to estimate the channel between the base station and the UE. The CSI decoder may also generate precoding information, such as a precoding matrix indicator (PMI) for multiple input, multiple output (MIMO) transmissions when multiple antennas are present at the base station. The PMI specifies a precoding matrix that may be used for downlink transmission. The precoding matrix maps symbols from each layer to antenna ports of the base station and is based on a number of layers (e.g., streams) associated with a rank indication (RI). The rank is the number of layers the UE suggests for downlink transmissions to the UE.

Aspects of the present disclosure are directed to generating precoding vectors for different layers that are orthogonal to each other. According to aspects of the present disclosure, a dedicated functional layer is added in the neural network on the base station side to provide inter-layer orthogonality. The base station side neural network inter-layer orthogonalization layer may be inserted before a per-layer power normalization layer, if it is present in the CSI decoder. Otherwise, the inter-layer orthogonalization layer may be appended to existing functional layers of a CSI decoder.

The inter-layer orthogonalization layer may apply pre-processing to precoding vectors calculated by the functional layers. According to aspects of the present disclosure, the pre-processing may include sorting these precoding vectors by their Eigenvalue or singular values. In some aspects, the sorting is in descending order. The pre-processing may also include operations to the precoding vectors, such as reshaping, flattening, permuting, re-ordering, and/or composing complex numbers of the precoding vectors from real numbers, etc.

After pre-processing, in some aspects of the present disclosure, the orthogonalization may employ the Gram-Schmidt orthogonalization process. After orthogonalizing the precoding vectors, post-processing corresponding to any pre-processing operations may occur. For example, the post-processing layer may reshape the orthogonal precoding vectors, flatten the orthogonal precoding vectors, permutate the orthogonal precoding vectors, re-order the orthogonal precoding vectors, and/or decompose complex numbers of the orthogonal precoding vectors into real numbers.

By orthogonalizing the precoding vectors, inter-layer interference is reduced. Moreover, higher signal to noise plus interference ratios (SINRs) are achieved, increasing spectral efficiency (SE).

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The base stations 110 may include an orthogonal precoding module 138. For brevity, only one base station 110a is shown as including the orthogonal precoding module 138. The orthogonal precoding module 138 may receive a channel state information (CSI) payload at a neural network CSI decoder. The orthogonal precoding module 138 may also decode the CSI payload to generate a quantity (N) of precoding vectors for N transmission layers. The orthogonal precoding module 138 may further orthogonalize the N precoding vectors to generate N orthogonal precoding vectors. The orthogonal precoding module 138 may still further transmit, to a user equipment (UE), downlink data that is precoded in accordance with the N orthogonal precoding vectors.

As indicated above, FIG. 1 is provided merely as an example. Other examples may differ from what is described with regard to FIG. 1.

Figure 2:
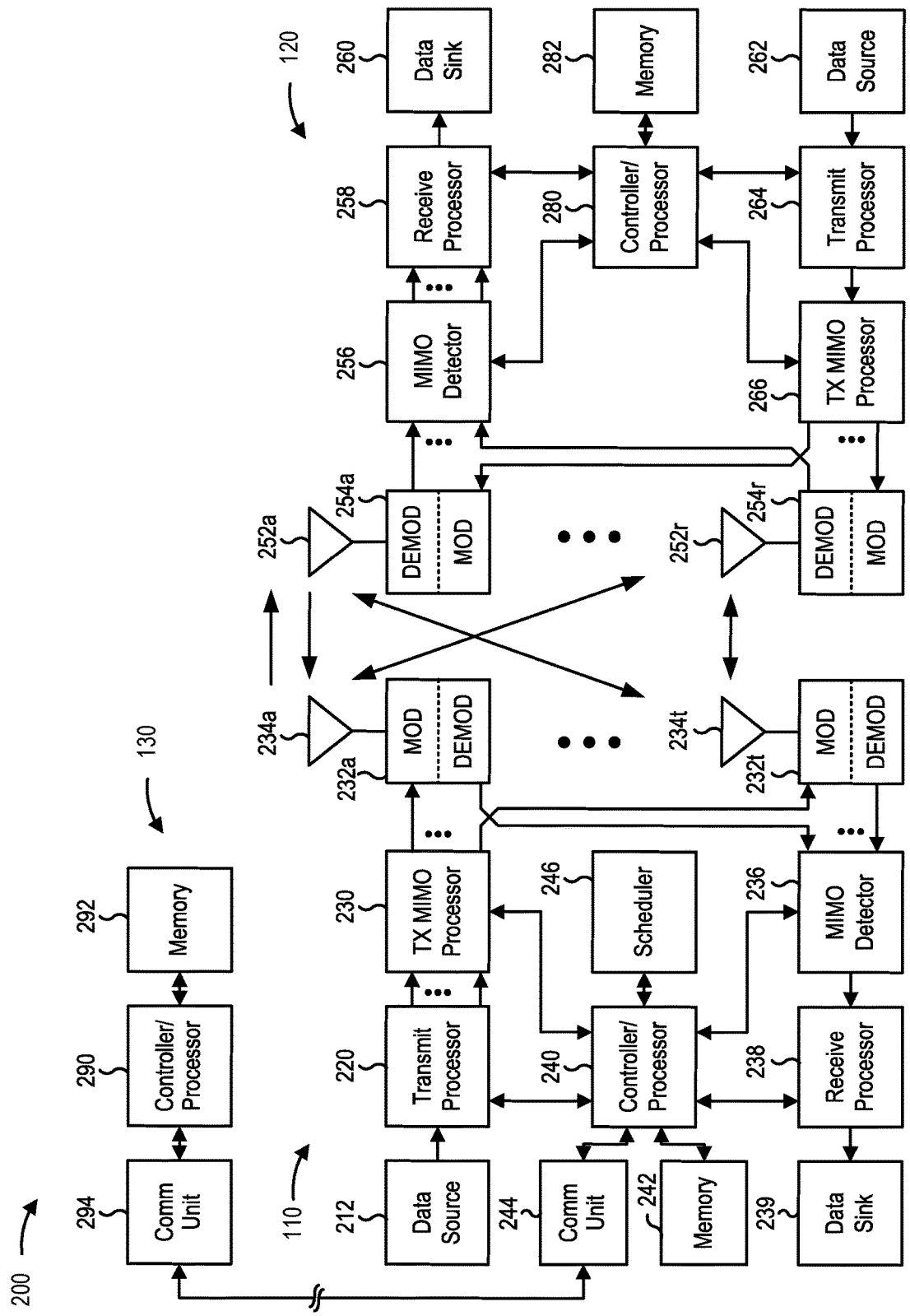
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110 and/or any other component(s) of FIG. 2 may perform one or more techniques associated with machine learning for orthogonal precoding, as described in more detail elsewhere. For example, the controller/processor 240 of the base station 110 and/or any other component(s) of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the base station 110 may include means for receiving, means for decoding, means for orthogonalizing, means for transmitting, means for normalizing, means for pre-processing, and/or means for post processing. Such means may include one or more components of the base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
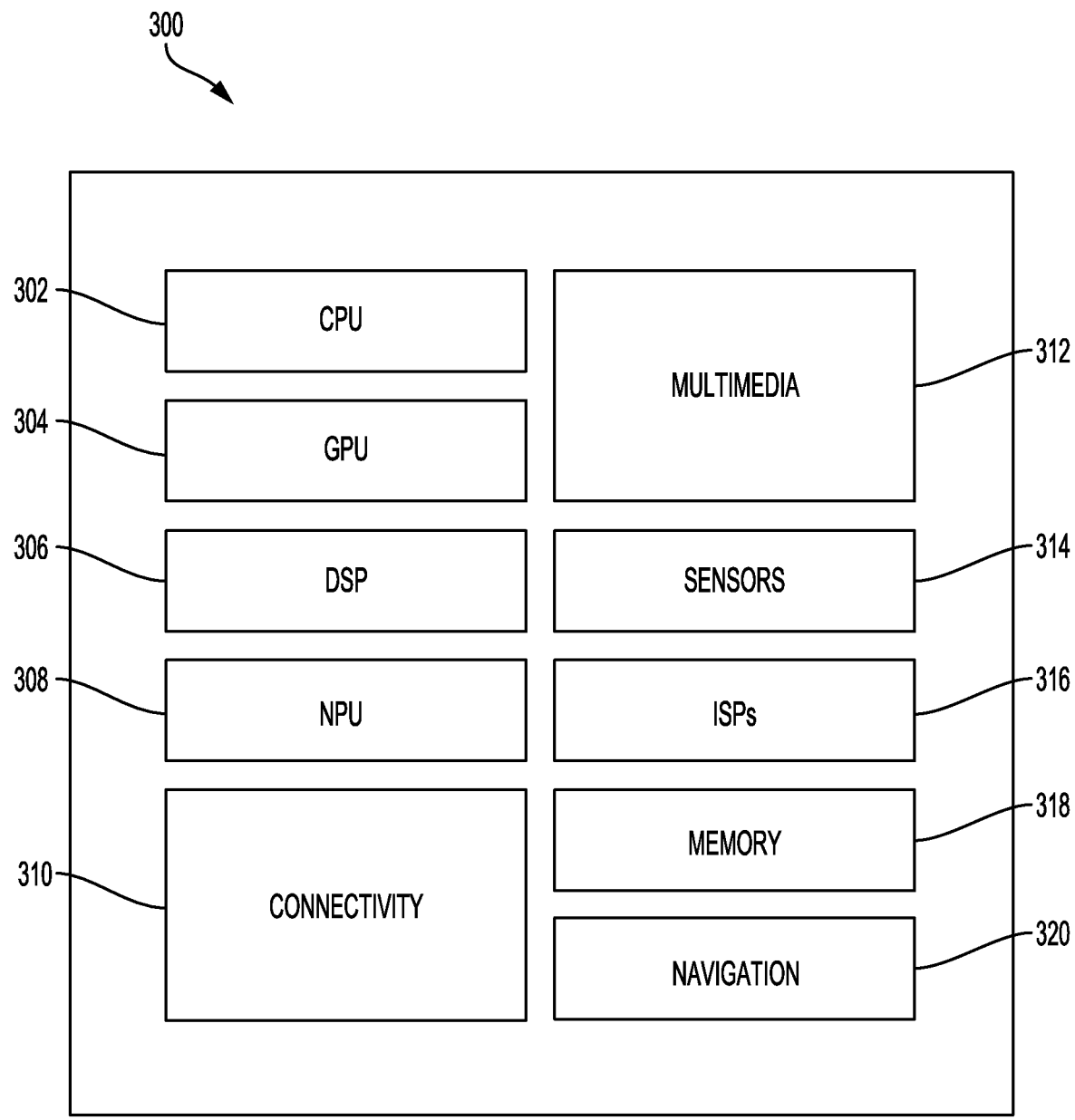
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive a channel state information (CSI) payload at a neural network CSI decoder. The processor 302 may also comprise code to decode the CSI payload to generate a quantity (N) of precoding vectors for N transmission layers. The processor 302 may further comprise code to orthogonalize the N precoding vectors to generate N orthogonal precoding vectors. The processor 302 may still further comprise code to transmit, to a user equipment (UE), downlink data that is precoded in accordance with the N orthogonal precoding vectors.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
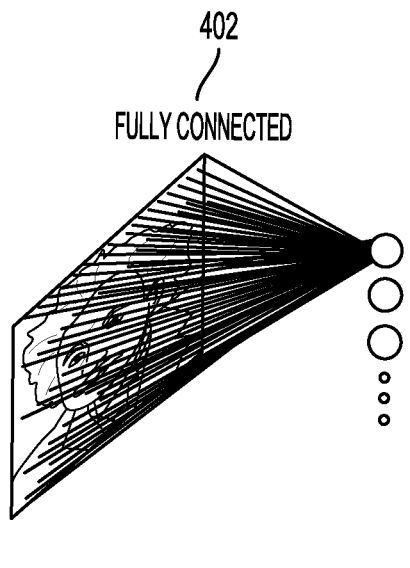
FIGS. 4A, 4B, and 4C are diagrams illustrating a neural network, in accordance with aspects of the present disclosure.
Figure 4B:
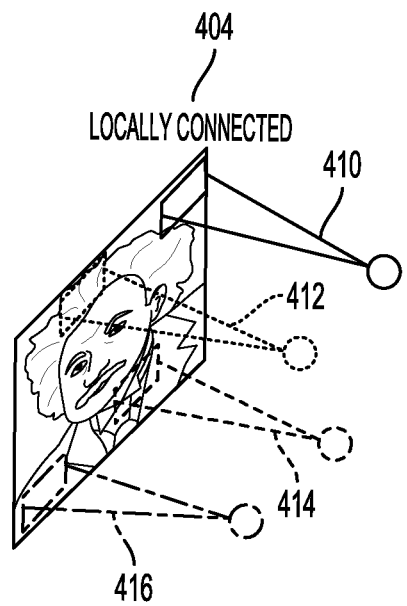

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
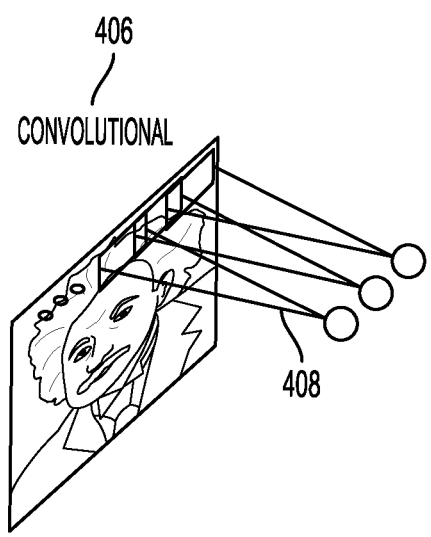

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
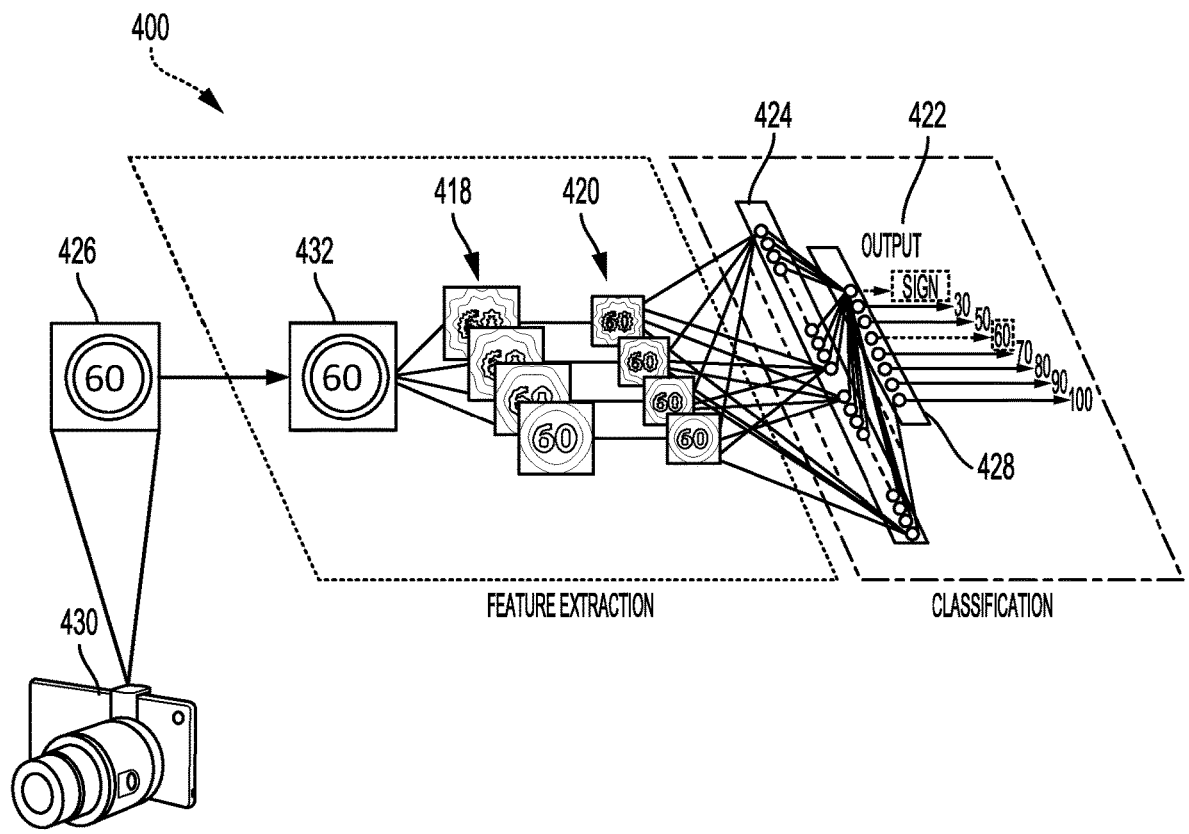
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
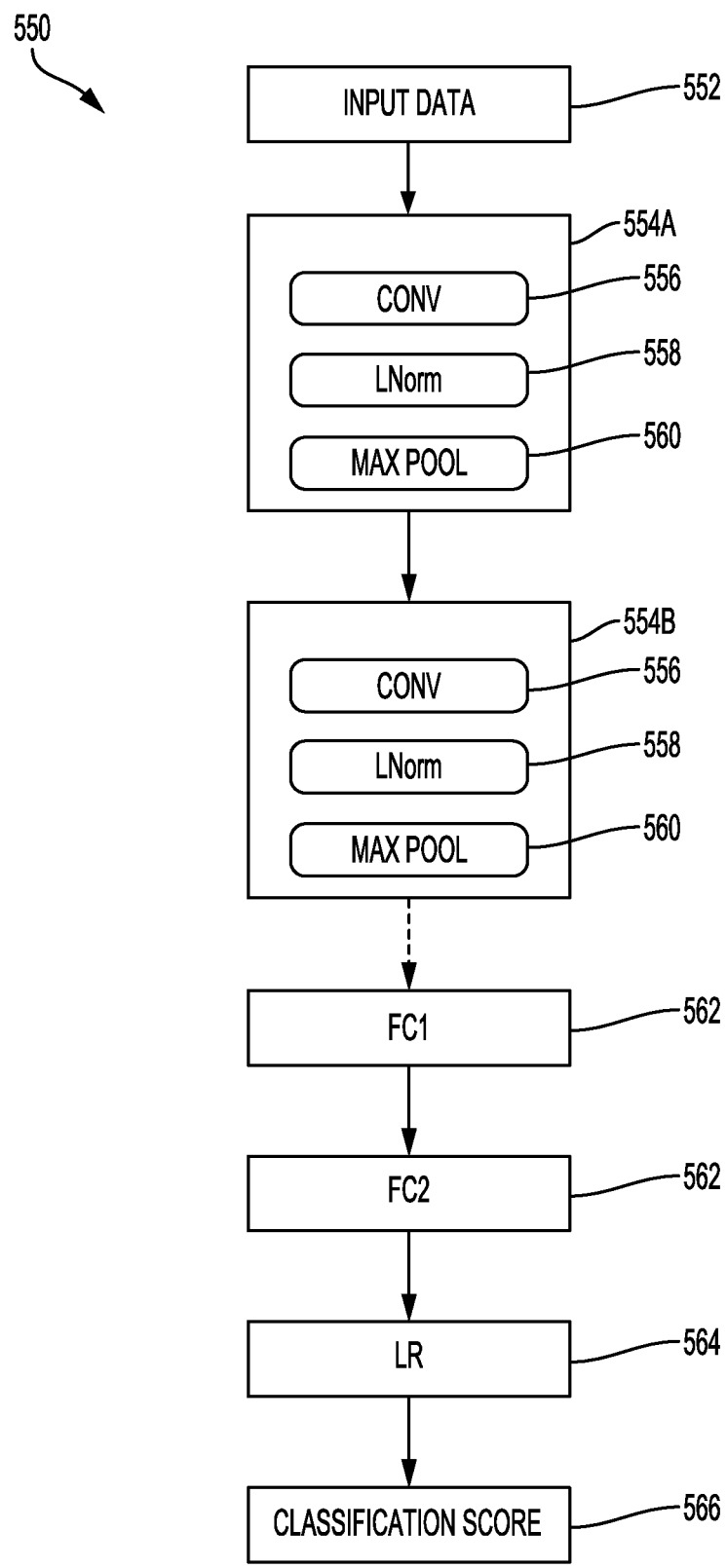
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Artificial intelligence (AI) is expected to be widely utilized in a variety of aspects of wireless communications. For example, a neural network may provide an artificial intelligence framework for communicating channel state information (CSI) between a base station and a UE. CSI information may include precoding matrix indicator (PMI) feedback, as well as other information such as a rank indictor (RI) and a channel quality indicator (CQI). Unfortunately, in existing neural network structures for CSI feedback, inter-layer orthogonality cannot be guaranteed when multiple antennas are used for transmission at the base station. That is, existing functional layers and activation functions of CSI feedback neural networks do not address orthogonality. Undoubtedly, this will lead to inter-layer interference, lower post-detection signal to noise plus interference ratios (SINRs), and reduced spectral efficiency (SE). Aspects of the present disclosure introduce a dedicated inter-layer orthogonalization functional layer in a channel state information decoder (e.g., a neural network at the base station) to achieve orthogonality among precoding vectors for different layers of a high rank transmission.

Figure 6:
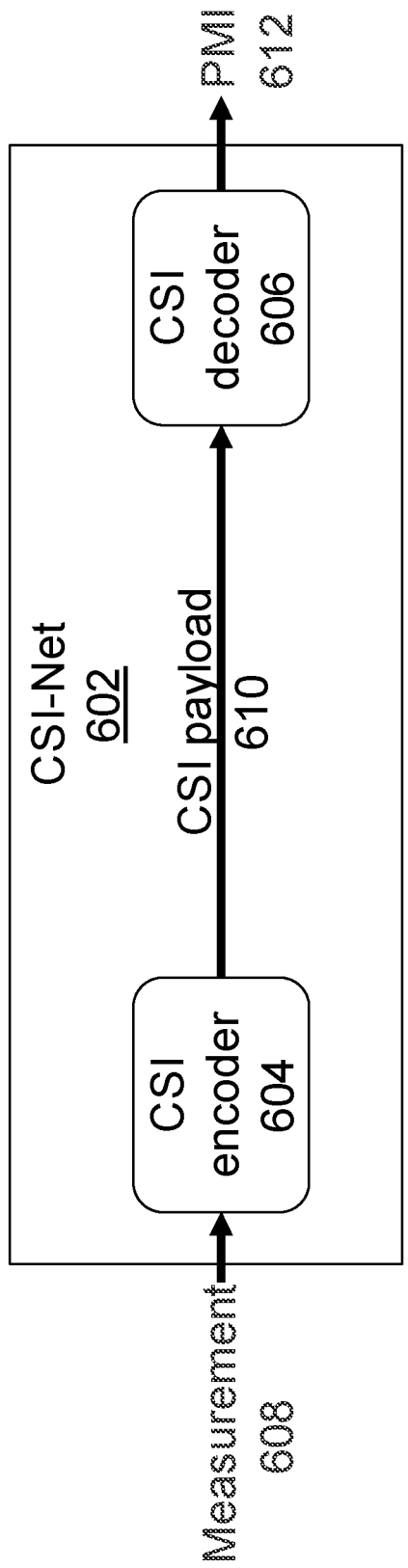
FIG. 6 is a block diagram illustrating an example neural network for communicating channel state information (CSI) feedback, in accordance with various aspects of the present disclosure.

FIG. 6 is a block diagram illustrating an example neural network for communicating channel state information (CSI) feedback, in accordance with various aspects of the present disclosure. In the example of FIG. 6, a channel state information network (CSI-Net) 602 communicates channel state information feedback from a UE to a base station. The CSI-Net 602 includes a CSI encoder 604, which is a neural network operating at the UE, and a CSI decoder 606, which is a neural network running at the base station. The CSI encoder 604 receives as input a measurement 608 of a received signal, such as a channel state information-reference signal (CSI-RS) received on CSI-RS resource elements (REs). A feedback report associated with the channel is generated based on receiving the reference signal. The CSI encoder 604 may quantize the feedback report and transmit it to the base station as a CSI payload 610.

The CSI decoder 606 receives the reported CSI payload 610 as input. The CSI decoder 606 may process the one or more quantized values to estimate the channel between the base station and the UE. The CSI decoder may also generate precoding information, such as a precoding matrix indicator (PMI) 612 for multiple input, multiple output (MIMO) transmissions when multiple antennas are present at the base station. The PMI 612 specifies a precoding matrix that may be used for downlink transmission. The precoding matrix maps symbols from each layer to antenna ports of the base station and is based on a number of layers (e.g., streams) associated with a rank indication (RI). The rank is the number of layers UE suggests for downlink transmissions to the UE.

In high rank cases, precoding vectors for different layers should be orthogonal with each other. Non-orthogonal precoding vectors result in inter-layer interference, causing a low signal to noise plus interference ratio (SINR) and a spectral efficiency loss. As noted above, in neural network-based PMI feedback, inter-layer orthogonality cannot be guaranteed. That is, functional layers of the neural network (such as fully connected layers, convolutional layers, batch normalization layers, etc.), and activation functions of the neural network (such as rectified linear unit (ReLU), Leaky ReLU, Sigmoid, Softmax, etc.) do not achieve orthogonality between precoding vectors. Aspects of the present disclosure are directed to generating precoding vectors for different layers that are orthogonal to each other.

According to aspects of the present disclosure, a dedicated functional layer is added in the neural network on the base station side to provide inter-layer orthogonality. The base station side neural network inter-layer orthogonalization layer may be inserted before a per-layer power normalization layer, if it is present in the CSI decoder. Otherwise, the inter-layer orthogonalization layer may be appended to existing functional layers of a CSI decoder.

Figure 7:
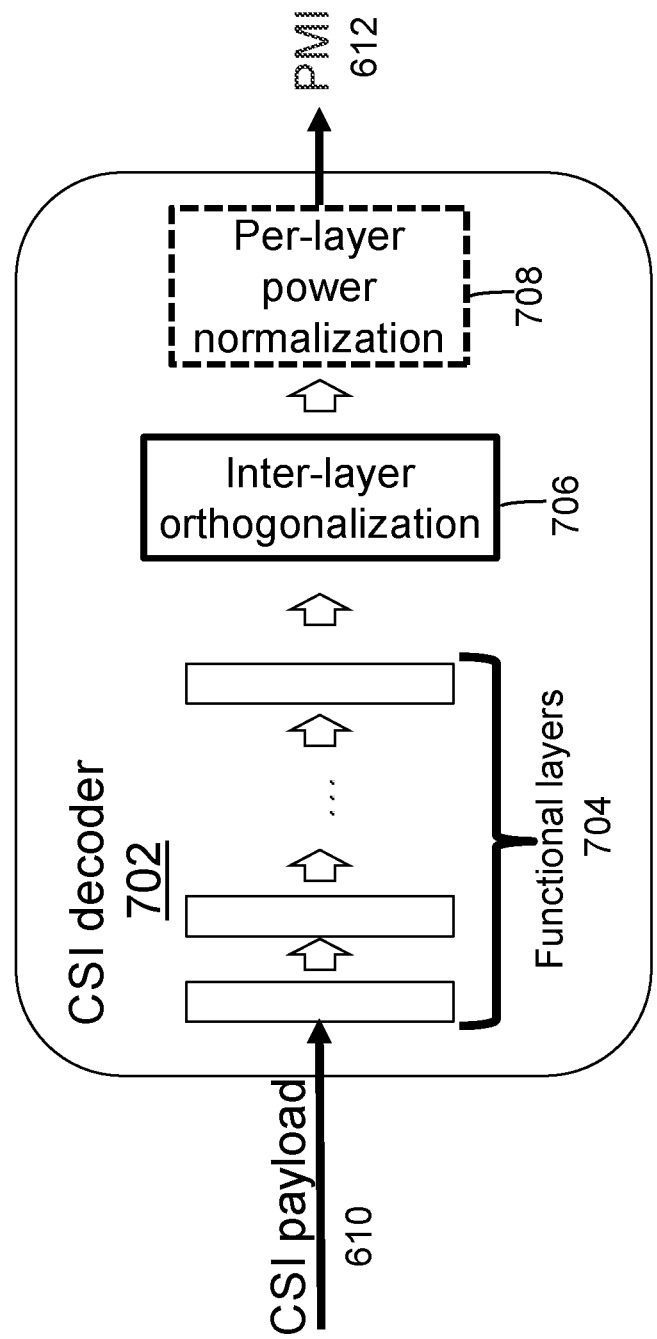
FIG. 7 is a block diagram illustrating an example channel state information (CSI) decoder, in accordance with various aspects of the present disclosure.

FIG. 7 is a block diagram illustrating an example channel state information (CSI) decoder, in accordance with various aspects of the present disclosure. In the example of FIG. 7, a CSI decoder 702 includes functional layers 704, an inter-layer orthogonalization layer 706, and a per-layer power normalization layer 708. The per-layer power normalization layer 708 is optional and sets the norm of each layer's precoding vector to one. CSI payload 610 from a CSI encoder (e.g., CSI encoder 604 shown in FIG. 6) is received as input to the CSI decoder 702. PMI 612 is output from the CSI decoder 702.

The inter-layer orthogonalization layer 706 may apply pre-processing to precoding vectors calculated by the functional layers 704. Each precoding vector is a rank-N precoding column vector with a length corresponding to the number of transmit antennas $N_{tx}$ at the base station. The functional layers 704 generate a quantity N of precoding vectors for N layers, which will be denoted by $w_r$, where r=1,2, . . . , N. The precoding vectors for each layer are complex value vectors, such that $w_r \in \mathbb{C}(N_{tx} \times 1)$, where r=1,2, . . . ,N, $N_{tx}$ is the number of transmit antenna ports at the base station, and N is the number of layers.

According to aspects of the present disclosure, the pre-processing may include sorting these precoding vectors by the corresponding Eigenvalues of the auto covariance of the channel matrix or the singular values of the channel matrix. In some aspects, the sorting is in descending order, such that $\lambda_1 \geq \lambda_2 \geq \ldots \geq \lambda_n$, where $\lambda_n$ represents the n-th largest Eigenvalue of the auto covariance of the channel matrix with the corresponding Eigenvector as the precoding vector of layer n, n=1, . . . , N; or σ 1≥σ2≥ . . . ≥σ N, where on represents n-th largest singular value of the channel matrix with the corresponding (right) singular vector as the precoding vector of layer n, n=1, . . . ,N . . . . The pre-processing may also include operations to the precoding vectors, such as reshaping, flattening, permuting, re-ordering, and/or composing complex numbers of the precoding vectors from real numbers, etc.

After pre-processing, in some aspects of the present disclosure, the orthogonalization may employ the Gram-Schmidt orthogonalization process. More specifically, the orthogonalization may define the (to be orthogonalized) precoding matrix W in accordance with equation 1 and define the orthogonal precoding matrix $\tilde{W}$ in accordance with equation 2:

$$W \triangleq [w_1 \ w_2 \ \ldots \ w_N] \quad (1)$$

$$\tilde{W} \triangleq [\tilde{w}_1 \ \tilde{w}_2 \ \ldots \ \tilde{w}_N] \quad (2)$$

To obtain the orthogonal precoding matrix $\tilde{W}$, the precoding vector of the first layer $w_1$ is kept as is, such that $\tilde{w}_1 = w_1$, where $w_1$ is a column vector for the first layer with a length of $N_{tx}$. For the remaining precoding vectors $W_r$, where r=2, . . . , N, a temporary matrix Wtmp is defined as Wtmp=$[\tilde{w}_1, \ldots, \tilde{w}_{r-1}]$. Each orthogonal precoding vector $\tilde{w}_r$ is then calculated in accordance with equation 3:

$$\tilde{w}_r = [I - Wtmp(Wtmp^H Wtmp)^{-1} Wtmp^H] w_r, \quad (3)$$

where I is the identity matrix and H represents the Hermitian transpose operation.

After orthogonalizing the precoding vectors, post-processing corresponding to any pre-processing operations may occur. For example, the inter-layer orthogonalization layer 706 may reshape the orthogonal precoding vectors, flatten the orthogonal precoding vectors, permutate the orthogonal precoding vectors, re-order the orthogonal precoding vectors, and/or decompose complex numbers of the orthogonal precoding vectors into real numbers.

Figure 8:
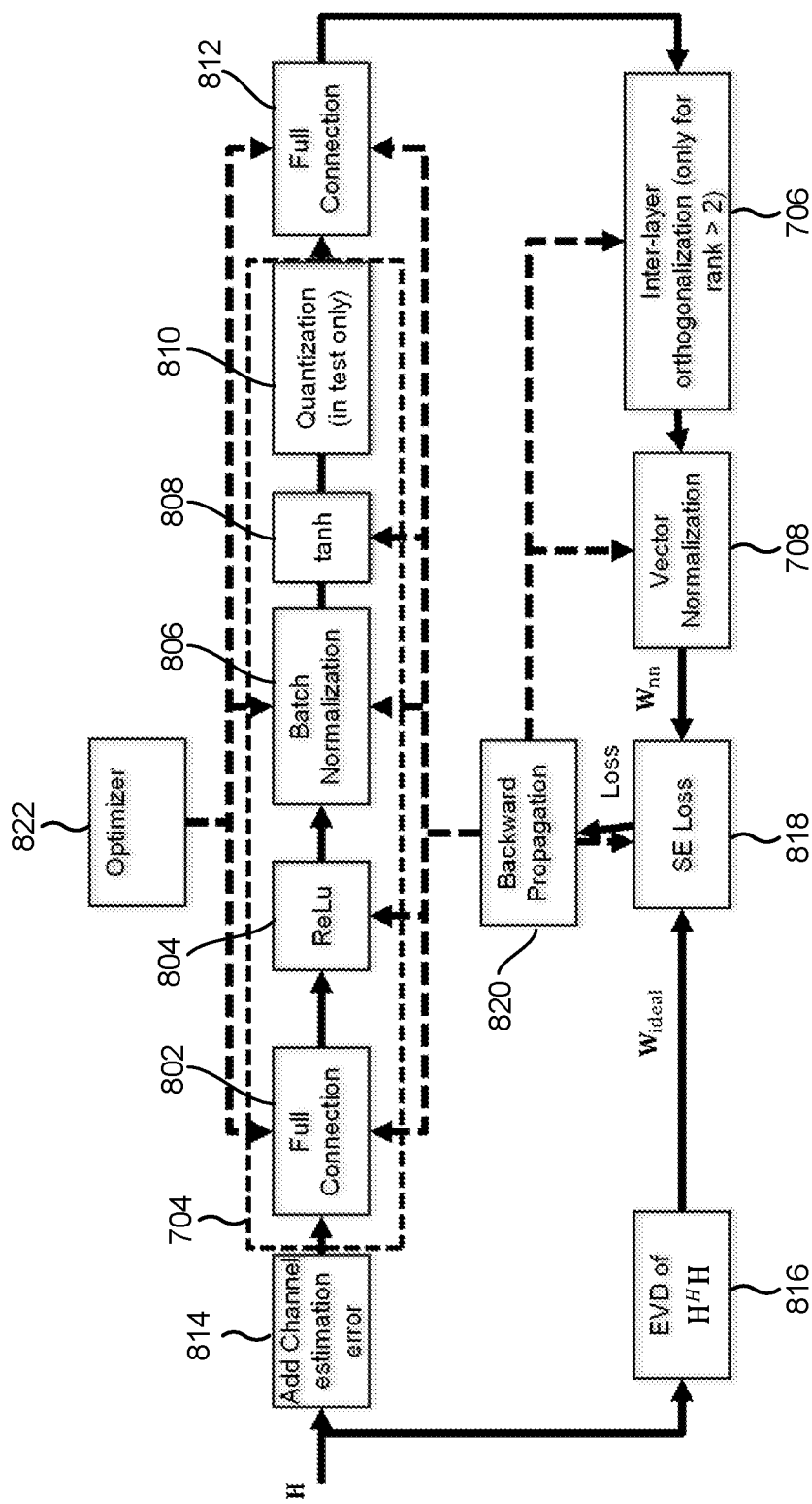
FIG. 8 is a block diagram illustrating an example neural network for training a channel state information (CSI) decoder, in accordance with various aspects of the present disclosure.

FIG. 8 is a block diagram illustrating an example neural network for training a channel state information (CSI) decoder, in accordance with various aspects of the present disclosure. In the example of FIG. 8, the functional layers 704 and the activation functions of a CSI decoder (e.g., the CSI decoder 702 shown in FIG. 7) may include a fully connected layer 802, a ReLU activation function 804, a batch normalization layer 806, and a hyperbolic tangent (tanh) activation function 808. During testing, a quantization block 810 may also be provided. Another fully connected layer 812 is provided before the inter-layer orthogonalization layer 706 and per-layer power normalization layer 708. An input channel matrix His received at a channel estimation error block 814, which models the impairment in channel estimation by adding channel estimation error to the input channel matrix and forwards the noisy signal to the functional layers 704. An Eigenvalue decomposition (EVD)

block 816 computes the complex conjugate of the ideal channel and generates Eigenvectors, $W_{ideal}$, for a spectral efficiency (SE) loss block 818. The SE loss block 818 may compute a loss value from the Eigenvectors, $W_{ideal}$, and a neural network estimated precoding matrix, $W_{nn}$, that is output by the per-layer power normalization layer 708. An exemplary formula for the loss function L is seen in equation 4:

$$L = \log_2|I + \gamma HW_{ideal}W_{ideal}^H H^H| - \log_2|I + \gamma HW_{nn}W_{nn}^H H^H| \quad (4)$$

where $\gamma$ is the SNR of each sample in the data set, for example, and H is the estimated channel on CSI-RS resource elements (REs), which may be offered by a CSI-RS based channel estimator.

Figure 9:
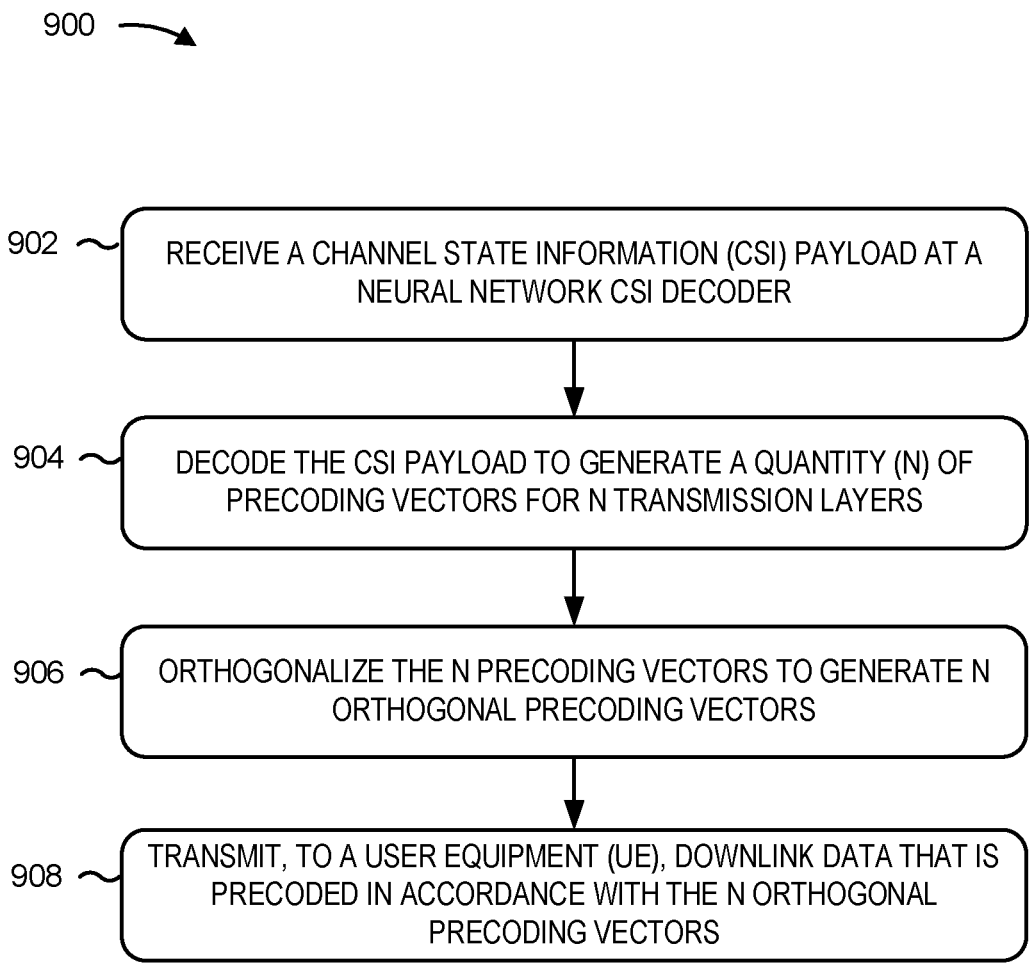
FIG. 9 is a flow diagram illustrating an example process performed, for example, by a base station, in accordance with various aspects of the present disclosure.

Based on the loss output from the SE loss block 818, a back propagation block 820 generates and forwards back propagation results to each of the fully connected layer 802, the ReLU activation function 804, the batch normalization layer 806, the tanh activation function 808, the fully connected layer 812, the inter-layer orthogonalization layer 706, the per-layer power normalization layer 708, and the SE loss block 818. The back propagation computes the gradient of each parameter in the neural network. An optimizer 822 may adjust the weight of each parameter based on the gradient calculated in back propagation. FIG. 9 is a flow diagram illustrating an example process 900 performed, for example, by a base station, in accordance with various aspects of the present disclosure. The example process 900 is an example of a neural network structure for communicating orthogonal precoding information between a network and a user equipment (UE). The operations of the process 900 may be implemented by a base station 110.

At block 902, the base station, receives a channel state information (CSI) payload at a neural network CSI decoder. For example, the base station (e.g. using the antenna 234, MOD/DEMOD 232, MIMO detector 236, receiver processor 238, controller/processor 240, and/or memory 242) may receive the CSI payload from a UE neural network.

At block 904, the base station, decodes the CSI payload to generate a quantity (N) of precoding vectors for N transmission layers. For example, the base station (e.g. using the controller/processor 240, and/or memory 242) may decode the CSI payload. The N precoding vectors may be complex valued vectors having a length based on a quantity of antenna ports of the base station. The base station may pre-process the N precoding vectors by: reshaping the N precoding vectors, flattening the N precoding vectors, permuting the N precoding vectors, re-ordering the N precoding vectors, and/or composing complex numbers of the N precoding vectors from real numbers At block 906, the base station, orthogonalizes the N precoding vectors to generate N orthogonal precoding vectors. For example, the base station (e.g. using the controller/processor 240, and/or memory 242) may orthogonalize the N precoding vectors. In some aspects, the base station pre-processes the N precoding vectors by Eigenvalues or singular values in descending order, prior to orthogonalizing. The orthogonalization may be performed in accordance with a Gram-Schmidt orthogonalization process.

At block 908, the base station, transmits, to a user equipment (UE), downlink data that is precoded in accordance with the N orthogonal precoding vectors. For example, the base station (e.g. using the antenna 234, MOD/DEMOD 232, TX MIMO processor 230, transmit processor 220, controller/processor 240, and/or memory 242) may transmit the downlink data. Prior to transmission, the base station may post process the N orthogonal precoding vectors by: reshaping the N orthogonal precoding vectors, flattening the N orthogonal precoding vectors, permuting the N orthogonal precoding vectors, re-ordering the N orthogonal precoding vectors, and/or decomposing complex numbers of the N orthogonal precoding vectors into real numbers Example Aspects Aspect 1: A method of wireless communication by a base station, comprising: receiving a channel state information (CSI) payload at a neural network CSI decoder; decoding the CSI payload to generate a quantity (N) of precoding vectors for N transmission layers; orthogonalizing the N precoding vectors to generate N orthogonal precoding vectors; and transmitting, to a user equipment (UE), downlink data that is precoded in accordance with the N orthogonal precoding vectors.

Aspect 2: The method of Aspect 1, further comprising normalizing transmission power for each orthogonal precoding vector of each transmission layer.

Aspect 3: The method of Aspect 1 or 2, further comprising pre-processing the N precoding vectors with corresponding Eigenvalues or singular values in descending order.

Aspect 4: The method of any of the preceding Aspects, in which the N precoding vectors are complex valued vectors having a length based on a quantity of antenna ports of the base station.

Aspect 5: The method of any of the preceding Aspects, further comprising pre-processing the N precoding vectors by at least one of: reshaping the N precoding vectors, flattening the N precoding vectors, permuting the N precoding vectors, re-ordering the N precoding vectors, or composing complex numbers of the N precoding vectors from real numbers.

Aspect 6: The method of any of the preceding Aspects, further comprising post processing the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

Aspect 7: An apparatus for wireless communication by a base station, comprising: a memory; and at least one processor coupled to the memory, the at least one processor configured: to receive a channel state information (CSI) payload at a neural network CSI decoder; to decode the CSI payload to generate a quantity (N) of precoding vectors for N transmission layers; to orthogonalize the N precoding vectors to generate N orthogonal precoding vectors; and to transmit, to a user equipment (UE), downlink data that is precoded in accordance with the N orthogonal precoding vectors.

Aspect 8: The apparatus of Aspect 7, in which the at least one processor is further configured to normalize transmission power for each orthogonal precoding vector of each transmission layer.

Aspect 9: The apparatus of Aspect 7 or 8, in which the at least one processor is further configured to pre-process the N precoding vectors with corresponding Eigenvalues or singular values in descending order.

Aspect 10: The apparatus of any of the Aspects 7-9, in which the N precoding vectors are complex valued vectors having a length based on a quantity of antenna ports of the base station.

Aspect 11: The apparatus of any of the Aspects 7-10, in which the at least one processor is further configured to pre-process the N precoding vectors by at least one of: reshaping the N precoding vectors, flattening the N precoding vectors, permuting the N precoding vectors, re-ordering the N precoding vectors, or composing complex numbers of the N precoding vectors from real numbers.

Aspect 12: The apparatus of any of the Aspects 7-11, in which the at least one processor is further configured to post process the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

Aspect 13: A non-transitory computer-readable medium having program code recorded thereon, the program code executed by a processor at a base station and comprising: program code to receive a channel state information (CSI) payload at a neural network CSI decoder; program code to decode the CSI payload to generate a quantity (N) of precoding vectors for N transmission layers; program code to orthogonalize the N precoding vectors to generate N orthogonal precoding vectors; and program code to transmit, to a user equipment (UE), downlink data that is precoded in accordance with the N orthogonal precoding vectors.

Aspect 14: The non-transitory computer-readable medium of Aspect 13, in which the program code further comprises program code to normalize transmission power for each orthogonal precoding vector of each transmission layer.

Aspect 15: The non-transitory computer-readable medium of Aspect 13 or 14, in which the program code further comprises program code to pre-process the N precoding vectors with corresponding Eigenvalues or singular values in descending order.

Aspect 16: The non-transitory computer-readable medium of any of the Aspects 13-15, in which the N precoding vectors are complex valued vectors having a length based on a quantity of antenna ports of the base station.

Aspect 17: The non-transitory computer-readable medium of any of the Aspects 13-16, in which the program code further comprises program code to pre-process the N precoding vectors by at least one of: reshaping the N precoding vectors, flattening the N precoding vectors, permuting the N precoding vectors, re-ordering the N precoding vectors, or composing complex numbers of the N precoding vectors from real numbers.

Aspect 18: The non-transitory computer-readable medium of any of the Aspects 13-17, in which the program code further comprises program code to post process the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

Aspect 19: An apparatus for wireless communication by a base station, comprising: means for receiving a channel state information (CSI) payload at a neural network CSI decoder; means for decoding the CSI payload to generate a quantity (N) of precoding vectors for N transmission layers; means for orthogonalizing the N precoding vectors to generate N orthogonal precoding vectors; and means for transmitting, to a user equipment (UE), downlink data that is precoded in accordance with the N orthogonal precoding vectors.

Aspect 20: The apparatus of Aspect 19, further comprising means for normalizing transmission power for each orthogonal precoding vector of each transmission layer.

Aspect 21: The apparatus of Aspect 19 or 20, further comprising means for pre-processing the N precoding vectors with corresponding Eigenvalues or singular values in descending order.

Aspect 22: The apparatus of any of the Aspects 19-21, in which the N precoding vectors are complex valued vectors having a length based on a quantity of antenna ports of the base station.

Aspect 23: The apparatus of any of the Aspects 19-22, further comprising means for pre-processing the N precoding vectors by at least one of: reshaping the N precoding vectors, flattening the N precoding vectors, permuting the N precoding vectors, re-ordering the N precoding vectors, or composing complex numbers of the N precoding vectors from real numbers.

Aspect 24: The apparatus of any of the Aspects 19-23, further comprising post processing the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a base station, comprising:
   receiving a channel state information (CSI) payload at a neural network CSI decoder;
   decoding the CSI payload to generate a quantity (N) of precoding vectors for N transmission layers;
   orthogonalizing the N precoding vectors to generate N orthogonal precoding vectors; and
   transmitting, to a user equipment (UE), downlink data that is precoded in accordance with the N orthogonal precoding vectors.

2. The method of claim 1, further comprising normalizing transmission power for each orthogonal precoding vector of each transmission layer.

3. The method of claim 1, further comprising pre-processing the N precoding vectors with corresponding Eigenvalues or singular values in descending order.

4. The method of claim 1, in which the N precoding vectors are complex valued vectors having a length based on a quantity of antenna ports of the base station.

5. The method of claim 1, further comprising pre-processing the N precoding vectors by at least one of: reshaping the N precoding vectors, flattening the N precoding vectors, permuting the N precoding vectors, re-ordering the N precoding vectors, or composing complex numbers of the N precoding vectors from real numbers.

6. The method of claim 5, further comprising post processing the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

7. An apparatus for wireless communication by a base station, comprising:
   a memory; and
   at least one processor coupled to the memory, the at least one processor configured:
      to receive a channel state information (CSI) payload at a neural network CSI decoder;
      to decode the CSI payload to generate a quantity (N) of precoding vectors for N transmission layers;
      to orthogonalize the N precoding vectors to generate N orthogonal precoding vectors; and
      to transmit, to a user equipment (UE), downlink data that is precoded in accordance with the N orthogonal precoding vectors.

8. The apparatus of claim 7, in which the at least one processor is further configured to normalize transmission power for each orthogonal precoding vector of each transmission layer.

9. The apparatus of claim 7, in which the at least one processor is further configured to pre-process the N precoding vectors with corresponding Eigenvalues or singular values in descending order.

10. The apparatus of claim 7, in which the N precoding vectors are complex valued vectors having a length based on a quantity of antenna ports of the base station.

11. The apparatus of claim 7, in which the at least one processor is further configured to pre-process the N precoding vectors by at least one of: reshaping the N precoding vectors, flattening the N precoding vectors, permuting the N precoding vectors, re-ordering the N precoding vectors, or composing complex numbers of the N precoding vectors from real numbers.

12. The apparatus of claim 11, in which the at least one processor is further configured to post process the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

13. A non-transitory computer-readable medium having program code recorded thereon, the program code executed by a processor at a base station and comprising:
   program code to receive a channel state information (CSI) payload at a neural network CSI decoder;
   program code to decode the CSI payload to generate a quantity (N) of precoding vectors for N transmission layers;
   program code to orthogonalize the N precoding vectors to generate N orthogonal precoding vectors; and
   program code to transmit, to a user equipment (UE), downlink data that is precoded in accordance with the N orthogonal precoding vectors.

14. The non-transitory computer-readable medium of claim 13, in which the program code further comprises program code to normalize transmission power for each orthogonal precoding vector of each transmission layer.

15. The non-transitory computer-readable medium of claim 13, in which the program code further comprises program code to pre-process the N precoding vectors with corresponding Eigenvalues or singular values in descending order.

16. The non-transitory computer-readable medium of claim 13, in which the N precoding vectors are complex valued vectors having a length based on a quantity of antenna ports of the base station.

17. The non-transitory computer-readable medium of claim 13, in which the program code further comprises program code to pre-process the N precoding vectors by at least one of: reshaping the N precoding vectors, flattening the N precoding vectors, permuting the N precoding vectors, re-ordering the N precoding vectors, or composing complex numbers of the N precoding vectors from real numbers.

18. The non-transitory computer-readable medium of claim 17, in which the program code further comprises program code to post process the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

19. An apparatus for wireless communication by a base station, comprising:
   means for receiving a channel state information (CSI) payload at a neural network CSI decoder;
   means for decoding the CSI payload to generate a quantity (N) of precoding vectors for N transmission layers;
   means for orthogonalizing the N precoding vectors to generate N orthogonal precoding vectors; and
   means for transmitting, to a user equipment (UE), downlink data that is precoded in accordance with the N orthogonal precoding vectors.

20. The apparatus of claim 19, further comprising means for normalizing transmission power for each orthogonal precoding vector of each transmission layer.

21. The apparatus of claim 19, further comprising means for pre-processing the N precoding vectors with corresponding Eigenvalues or singular values in descending order.

22. The apparatus of claim 19, in which the N precoding vectors are complex valued vectors having a length based on a quantity of antenna ports of the base station.

23. The apparatus of claim 19, further comprising means for pre-processing the N precoding vectors by at least one of: reshaping the N precoding vectors, flattening the N precoding vectors, permuting the N precoding vectors, re-ordering the N precoding vectors, or composing complex numbers of the N precoding vectors from real numbers.

24. The apparatus of claim 23, further comprising means for post processing the N orthogonal precoding vectors by at least one of: reshaping the N orthogonal precoding vectors, flattening the N orthogonal precoding vectors, permuting the N orthogonal precoding vectors, re-ordering the N orthogonal precoding vectors, or decomposing complex numbers of the N orthogonal precoding vectors into real numbers.

\* \* \* \* \*